(12) United States Patent
Pugh et al.

(10) Patent No.: US 9,129,208 B2
(45) Date of Patent: Sep. 8, 2015

(54) METHOD AND SYSTEM FOR DETERMINING AN OBJECT TYPE FROM RASTER DATA IN AN IMAGE FORMING APPARATUS

(71) Applicant: KYOCERA Document Solutions Inc., Osaka (JP)

(72) Inventors: Eric Pugh, Torrance, CA (US); Michael M. Chang, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/180,583

(22) Filed: Feb. 14, 2014

(65) Prior Publication Data

US 2014/0268194 A1    Sep. 18, 2014

Related U.S. Application Data

(60) Provisional application No. 61/788,823, filed on Mar. 15, 2013.

(51) Int. Cl.
*G06K 15/02* (2006.01)
*H04N 1/40* (2006.01)
*H04N 1/60* (2006.01)

(52) U.S. Cl.
CPC ........ *G06K 15/1878* (2013.01); *H04N 1/40062* (2013.01); *H04N 1/6072* (2013.01)

(58) Field of Classification Search
USPC .......... 358/1.9, 518, 2.1, 1.15, 1.13; 345/694
See application file for complete search history.

(56) References Cited

U.S. PATENT DOCUMENTS

| | | | |
|---|---|---|---|
| 5,018,024 A | 5/1991 | Tanioka | |
| 5,392,365 A | 2/1995 | Steinkirchner | |
| 5,706,096 A | 1/1998 | Koike | |
| 2007/0031051 A1* | 2/2007 | Lee et al. | 382/239 |
| 2007/0229888 A1* | 10/2007 | Matsui | 358/1.15 |

FOREIGN PATENT DOCUMENTS

JP      2006-173957 A    6/2006

OTHER PUBLICATIONS

Extended European Search Report and Opinion for App. No. EP 14159348.3, mailed Jul. 7, 2014, 8 pages.

* cited by examiner

*Primary Examiner* — Quang N Vo
(74) *Attorney, Agent, or Firm* — McDonnell Boehnen Hulbert & Berghoff LLP (57) ABSTRACT

A method for determining a color profile from received raster data and printing the raster data is provided. Color profiles provide a mapping from a color space of the raster data to a color space of the printer, which typically uses CMYK toner or ink. A text color profile may be employed to print crisper text, or a photo color profile may be employed to produce better images. The raster data includes a plurality of raster scan lines containing digital pixel values. The method includes determining a number of sequentially repeated digital pixel values and a number of sequentially non-repeated digital pixel values for the plurality of raster scan lines. A color profile is selected based on a determination between the repeated and non-repeated digital pixel values. An example image forming apparatus that may carry out the method is also provided.

17 Claims, 9 Drawing Sheets

|     | 403 | 405 | 407 | 409 | 411 | 413 | 415 | 417 |
|-----|-----|-----|-----|-----|-----|-----|-----|-----|
| 402 | 0 0<br>0 0 | 0 0<br>0 0 | 0 0<br>0 0 | 0 0<br>0 0 | 0 0<br>0 0 | 0 0<br>0 0 | 0 0<br>0 0 | 0 0<br>0 0 |
| 404 | 0 0<br>0 0 | 0 0<br>0 0 | 0 0<br>0 0 | 35 9<br>0 0 | 35 9<br>0 0 | 0 0<br>0 0 | 0 0<br>0 0 | 0 0<br>0 0 |
| 406 | 0 0<br>0 0 | 0 0<br>0 0 | 35 9<br>0 0 | 35 9<br>0 0 | 35 9<br>0 0 | 35 9<br>0 0 | 0 0<br>0 0 | 0 0<br>0 0 |
| 408 | 0 0<br>0 0 | 35 9<br>0 0 | 35 9<br>0 0 | 100 49<br>0 70 | 100 49<br>0 70 | 35 9<br>0 0 | 35 9<br>0 0 | 0 0<br>0 0 |
| 410 | 0 0<br>0 0 | 35 9<br>0 0 | 35 9<br>0 0 | 100 49<br>0 70 | 100 49<br>0 70 | 35 9<br>0 0 | 35 9<br>0 0 | 0 0<br>0 0 |
| 412 | 0 0<br>0 0 | 0 0<br>0 0 | 35 9<br>0 0 | 35 9<br>0 0 | 35 9<br>0 0 | 35 9<br>0 0 | 0 0<br>0 0 | 0 0<br>0 0 |
| 414 | 0 0<br>0 0 | 0 0<br>0 0 | 0 0<br>0 0 | 35 9<br>0 0 | 35 9<br>0 0 | 0 0<br>0 0 | 0 0<br>0 0 | 0 0<br>0 0 |
| 416 | 0 0<br>0 0 | 0 0<br>0 0 | 0 0<br>0 0 | 0 0<br>0 0 | 0 0<br>0 0 | 0 0<br>0 0 | 0 0<br>0 0 | 0 0<br>0 0 |

400

502 — Red, Green, Blue, Yellow
R G
B Y

METHOD AND SYSTEM FOR DETERMINING AN OBJECT TYPE FROM RASTER DATA IN AN IMAGE FORMING APPARATUS

RELATED APPLICATIONS

This application claims priority to U.S. Provisional Application No. 61/788,823, filed Mar. 15, 2013, the entire contents of which are incorporated by reference herein.

BACKGROUND

A typical image forming apparatus uses toner or ink to form images on paper. The toner or ink most commonly comes in four different colors—cyan, magenta, yellow, and black (CMYK). In a typical operation of an image forming apparatus, a print job is received, a color conversion process from the image color space (such as RGB) to the printing color space (such as CMYK) is performed, and an appropriate amount of each of the colors of toner or ink is applied to form an image on a page. However, using every single color of toner or ink in order to produce an image on a page may result in a poor quality and visual artifacts. For instance, printing a page consisting mostly of black or gray text against a white background using cyan, magenta, yellow, and black toner or ink may produce "color fringes" (sometimes referred to as "chromatic aberrations") around the text, resulting in a fuzzy text printed onto the page.

In order to remedy the quality issues when printing with all colors of CMYK toner or ink, a color profile may be employed that specifies how color conversion is performed. The color profile is used to convert the document or image in a print job from its original color space (such as RGB) to a CMYK color space, which may then be employed by an image forming apparatus to use CMYK toner or ink to produce an image on a page. In the example of a document consisting mostly of black text against a white background, a text color profile that converts a document or image into CMYK color space maps RGB color pixels to CMYK pixel values and maps RGB black/gray pixels to K-only pixel values; in other words, pixels with color are mapped to full CMYK values, whereas pixels without color (black or gray) are mapped so that the CMY values are set to zero and only the K value remains. Employing a text color profile thus does not produce a black and white only document, but instead suppresses the use of cyan, magenta, and yellow toner or ink for any pixels that are black or neutral gray, thereby avoiding the color fringes while still printing a document in color. Thus, sending a printer both the image to be printed and a color profile may improve the quality of the image to be printed onto a page. Note that the color profile sent to an image forming apparatus is typically included as metadata along with the raster data, and has been predetermined by a computer, for example.

The image forming apparatus may select the color profile used for a respective print job based on metadata contained within the print job information received by the image forming apparatus (from a personal computer, for example). This metadata may be configured in a variety of different ways for different printing devices. However, as the types of computing devices sending the data to image forming apparatuses and print job data format standards become increasingly diverse, it becomes more difficult to have a particular computing device send compatible data to a particular image forming apparatus. In other words, in order to execute a print job on a specific image forming apparatus, a computing device must be aware of the print job data format compatible with that specific image forming apparatus.

In order to remedy the compatibility issues that arise from these different printing standards and increasing diversity of computing devices, the metadata may be removed entirely and the raster data by itself may be sent to an image forming apparatus. This provides the advantage of improved compatibility in printing documents from a variety of computing devices to a variety of image forming apparatuses; however, it removes the ability to send over the document type containing a color profile that was previously embedded in the metadata.

In current implementations, an image forming apparatus may employ a default color profile that may not be appropriate for printing a respective print job. For example, the default color profile may be a photo color profile, even though the document contains mostly black or gray text, thus causing the image forming apparatus to unnecessarily print the text using colors other than black, which may result in "color fringes" and other visual artifacts to be formed on the printed page.

SUMMARY

Described herein are various embodiments for allaying the problems discussed above.

In accordance with a first embodiment, a system including at least a communication link, a data storage unit, a processor, and an image forming apparatus is provided. The communication link at least receives raster data from a computing device. The data storage unit stores the raster data, a number of sequentially repeated digital pixel values, and a number of sequentially non-repeated digital pixel values. The processor determines the number of sequentially repeated digital pixel values and the number of sequentially non-repeated digital pixel values, which are stored on the data storage unit. The image forming apparatus employs an appropriate color profile used to execute printing of the raster data.

According to a second embodiment, a method for determining an appropriate color profile based on received raster data is provided. The method according to the second embodiment includes receiving raster data, determining a number of sequentially repeated digital pixel values and a number of sequentially non repeated digital pixel values, selecting a color profile based on a comparison between the number of sequentially repeated pixel values and the number of sequentially non-repeated pixel values, and printing the raster data. The received raster data may be a bitmap, where the bitmap represents either text or a photo. The received raster data also has a plurality of raster scan lines, with each raster scan line having a sequence of digital pixel values. The color profile employed may be a text color profile if the number of sequentially repeated digital pixel values is greater than the number of sequentially non-repeated digital pixel values. Alternatively, the color profile may be a photo color profile if the number of sequentially repeated digital pixel values is less than or equal to the number of sequentially non-repeated digital pixel values.

In accordance with a third embodiment, a method for determining an appropriate color profile based on received raster data is provided. The method according to the third embodiment includes receiving raster data, determining at least one metric from the raster data, determining a document type based on the at least one metric, selecting a color profile based on the document type, and printing the raster data using the color profile.

These as well as other aspects and advantages will become apparent to those of ordinary skill in the art by reading the following detailed description with reference where appropriate to the accompanying drawings.

BRIEF DESCRIPTION OF THE DRAWINGS

Various example embodiments are described herein with reference to the following drawings.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

I. Example Image Forming System

Figure 1:
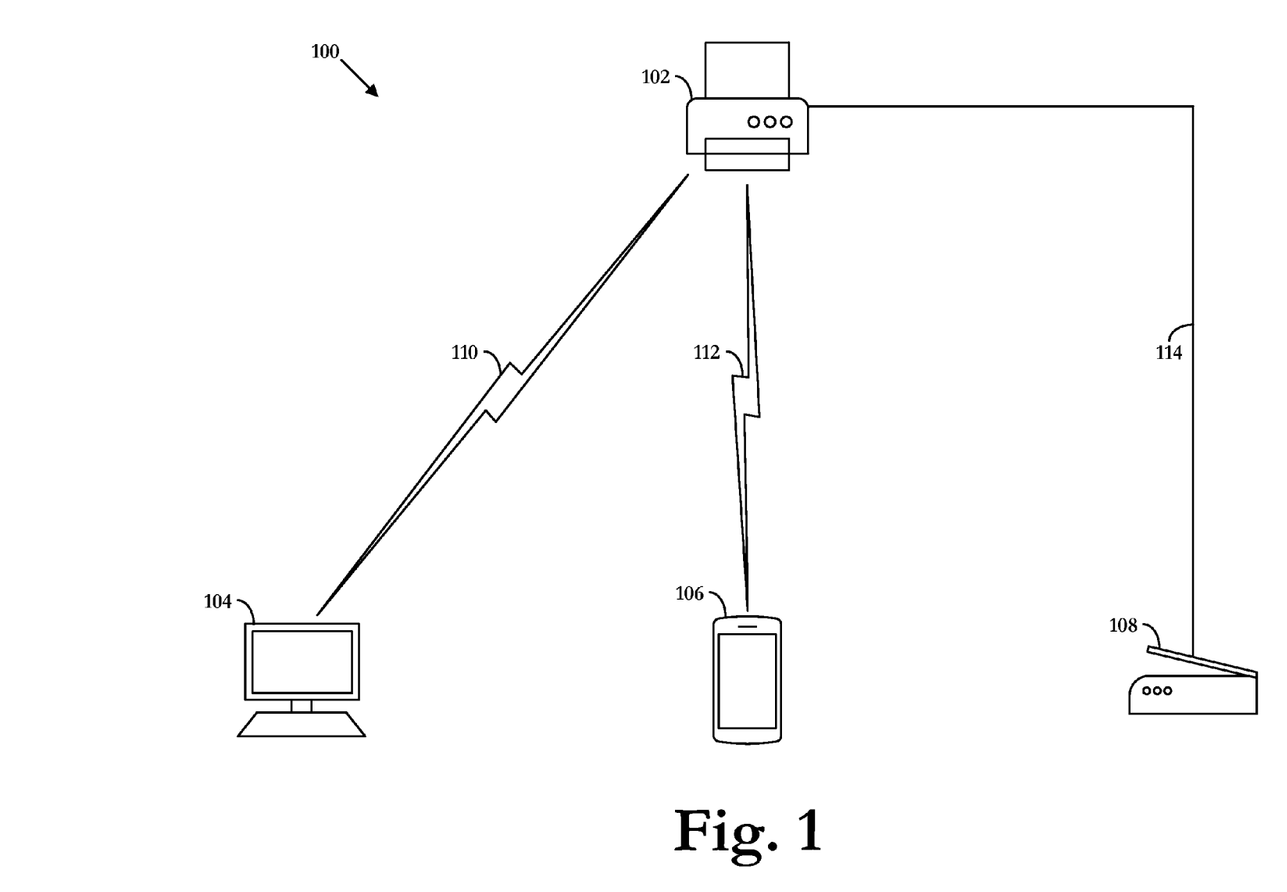
FIG. 1 is a block diagram of an image forming system, in accordance with one or more embodiments.

FIG. 1 is a block diagram of an image forming system 100, in accordance with one or more embodiments. As shown, image forming system 100 includes computing devices 104, 106, and 108 in the form of a personal computer (PC), a smartphone, and a scanner, respectively. The computing devices 104, 106, and 108 are each communicatively connected to an image forming apparatus 102 via a respective communication link 110, 112, or 114. Image forming apparatus 102 is described in detail below with reference to FIG. 3.

PC 104 may be any device (or collection of devices) capable of performing the PC functions described below. Accordingly, the PC could take the form of a desktop and/or laptop computer, and could include a keyboard, mouse, and computer monitor, for example. The PC could execute image-editing and/or image-viewing programs capable of instructing image forming apparatus 102 to print an image.

Smartphone 106 could take the form of a mobile computing platform and/or mobile cellphone, and could include a touch screen and a camera, for example. The camera may be able to photograph and store an image or a document. The smartphone 106 could execute image-editing and/or image-viewing programs capable of instructing image forming apparatus 102 to print an image.

Scanner 108 could take the form of a multifunction peripheral (MFP), a standalone scanner, and/or a handheld scanner. The scanner 108 could perform the function of capturing and storing an image and/or text in a document.

Communication links 110, 112, and 114 could take the form of wired and/or wireless links. A wired communication link could take the form of a serial bus, a parallel bus, a USB connection, and/or an IEEE 1394 connection, for example. A wireless communication link could take the form of a Bluetooth, IEEE 802.15.4 (ZigBee), ANT, Infrared Data Association (IrDA), and/or IEEE 802.11 (Wi-Fi) connection, to name just a few possibilities. Further, any of communication links 110, 112, and 114 could actually comprise multiple communication links, perhaps with other entities interposed along the multiple links. The communication links may take other forms and could provide different and/or additional functionality.

II. Example Computing Device

Figure 2:
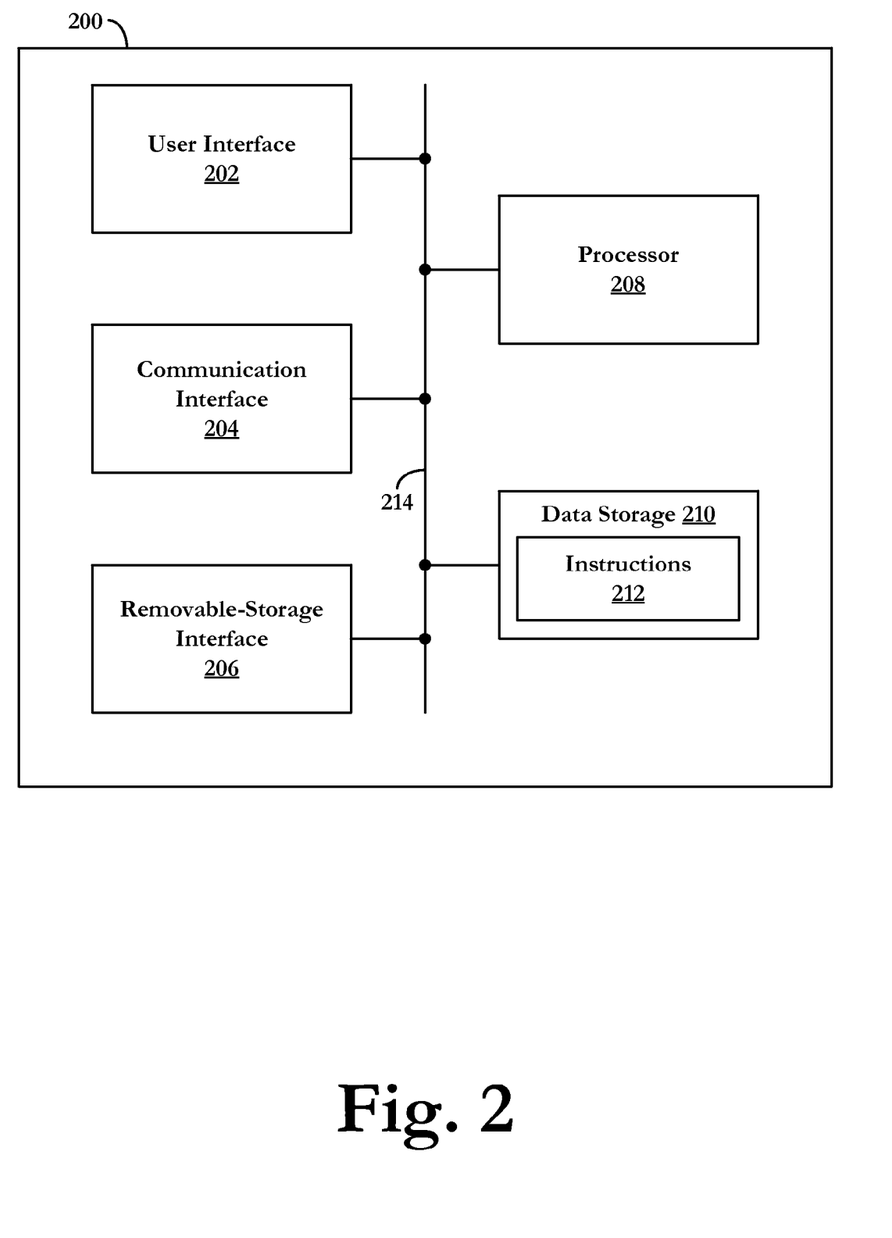
FIG. 2 is a block diagram of a computing device, in accordance with one or more embodiments.

FIG. 2 is a block diagram of a computing device 200, which may serve as one of the computing devices 104, 106, 108, in accordance with one or more embodiments. As shown, computing device 200 includes a user interface 202, a communication interface 204, a removable-storage interface 206, a processor 208, and a data storage 210 storing instructions 212. Each component is communicatively connected via bus 214. The computing device 200 could take the form of a personal digital assistant (PDA), a tablet computer, a computer server, and/or a wearable computer (to name just a few examples) in addition (or alternatively) to the PC 104, smartphone 106, and scanner 108 described previously. Computing device 200 may take other forms as well without departing from the scope of the claims.

User interface 202 may be any hardware component capable of accepting user input for interacting with the computing device. The user interface 202 could take the form of a keyboard, a mouse, a touch screen, or a microphone for voice-recognition, to name a few examples. User interface 202 may take other forms as well without departing from the scope of the claims, and may include or cooperate with one or more software components as well.

Communication interface 204 may be any hardware and/or software component (or components) capable of performing the communication-interface functions described herein. As such, the communication interface 204 may engage in wired and/or wireless communication with image forming apparatus 102 and/or one or more other computing devices. For example, as shown in FIG. 1, computing devices 104, 106, and 108 may be connected to image forming apparatus 102 via communications link 110, 112, and 114, respectively. Communication interface 204 could take the form of a modem, Ethernet, Wi-Fi, Universal Serial Bus (USB), and/or Bluetooth interface, among other possibilities. Communication interface 204 may take other forms as well without departing from the scope of the claims.

Removable-storage interface 206 may be any hardware and/or software component (or components) capable of performing the communication-interface functions described herein. As such, the removable-storage interface 206 could take the form of a Secure Digital (SD), xD-Picture Card, or CompactFlash interface; a USB flash drive or hard-disk drive; and/or an optical disk drive (such as a compact disk (CD) drive or digital versatile disk (DVD) drive), among numerous others.

Processor 208 may take the form of one or more general-purpose processors and/or one or more special-purpose processors or controllers (e.g., dedicated digital signal processor, application specific integrated circuit (ASIC), etc.), among others.

Data storage 210 may take the form of one or more volatile and/or non-volatile storage components, such as magnetic or optical memory or disk storage. Data storage 210 may be integrated in whole or in part with processing unit 208, as cache memory or registers, for instance. The data storage 210 could be a volatile storage (e.g., a RAM) and/or non-volatile storage (e.g., a ROM, a flash memory, a magnetic disk device such as a flexible disk drive and/or a hard-disk drive, a solid state drive, and/or a tape drive). Data storage 210 may be capable of storing other data in additional to instructions 212.

Instructions 212 may take the form of machine language instructions that define routines executable by processor 208 to carry out various functions described herein. The processor 208 may utilize user interface 202, communication interface 204, removable-storage interface 206, and/or other devices or components to carry out instructions 212.

Bus 214 may take the form of an electrical system bus that allows for internal communication among the user interface 202, the communication interface 204, the removable-storage interface 206, the processor 208, and the data storage 210.

Computing device 200 may contain additional components as well. For example, it may include additional processors for other dedicated purposes, multiple data storage units, multiple removable-storage interfaces, and multiple communication interfaces. Also, it may include cooling units, sound producing units, and/or display units, just to name a few examples. The computing device may be configured in a variety of ways not explicitly disclosed above, such as in one or more distributed computing sub-devices.

III. Example Image Forming Apparatus

Figure 3:
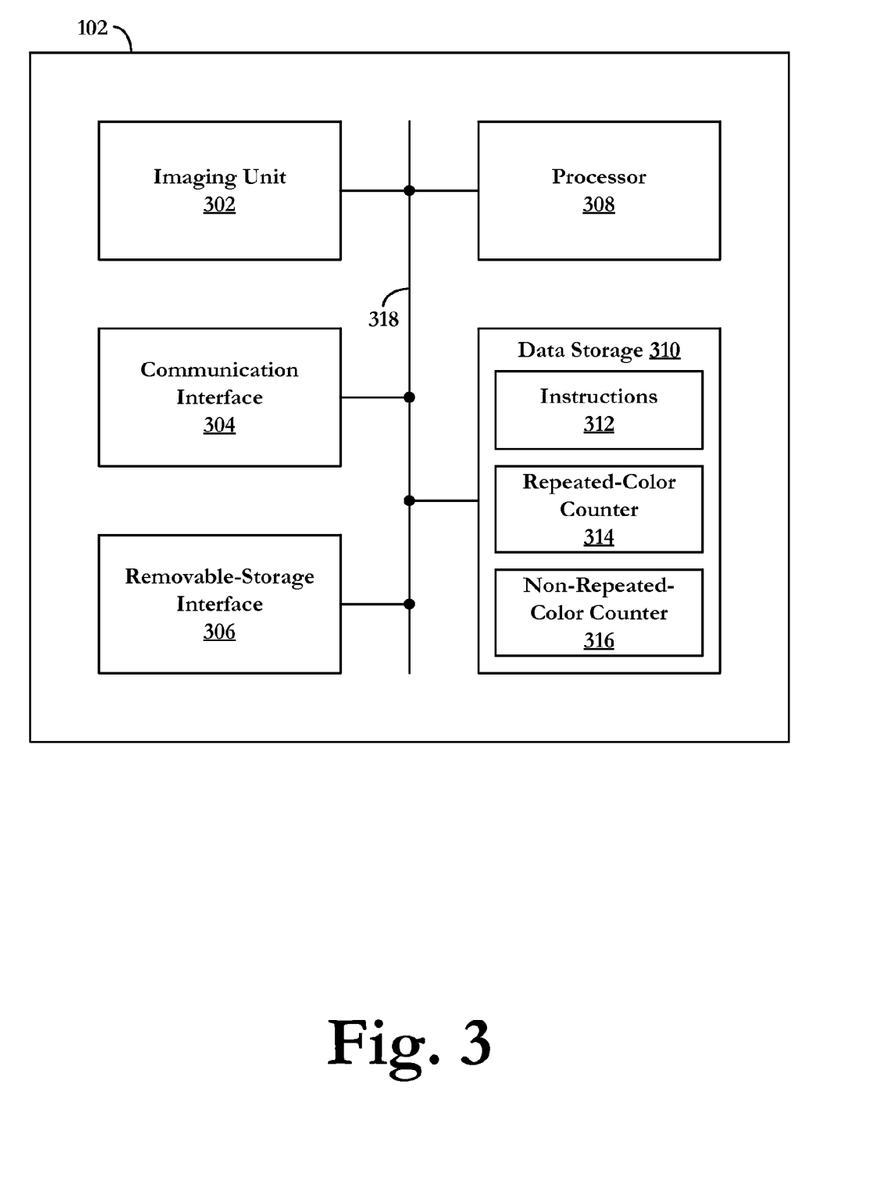
FIG. 3 is a block diagram of an image forming apparatus, in accordance with one or more embodiments.

FIG. 3 is a block diagram of the image forming apparatus 102, in accordance with one or more embodiments. As shown, image forming apparatus 102 includes an imaging unit 302, a communication interface 304, a removable-storage interface 306, a processor 308, and a data storage 310 storing instructions 312, a repeated-color counter 314, and a non-repeated-color counter 316. Each component is communicatively connected via bus 318. The communication interface 304, removable-storage interface 306, processor 308, data storage 310, instructions 312, and bus 318 may take forms similar (or identical) to those identically-named components described above with reference to FIG. 2. The image forming apparatus 102 could take the form of a multifunction peripheral (MFP) incorporating some or all of the functions performed by computing devices 104, 106, 108, and/or 200—functions such as image scanning, facsimile transmission, and facilitation of user input, among numerous other possibilities. As another possibility, image forming apparatus 102 could take the form of a standalone printer.

Imaging unit 302 may be any hardware and/or software component (or components) capable of performing the imaging-unit functions described herein. As such, the imaging unit 302 could take the form of a laser, inkjet, and/or dot-matrix imaging unit, among other possibilities. The imaging unit 302 may be configured to form images from print jobs received via communication interface 304 and/or removable-storage interface 306, as examples.

Repeated-color counter 314 and non-repeated-color counter 316 may be implemented as sections in data storage 310 and/or as dedicated memory units.

Bus 318 may take the form of an electrical system bus that allows for internal communication among the imaging unit 302, the communication interface 304, the removable-storage interface 306, the processor 308, and the data storage 310.

Repeated-color counter 314 and non-repeated-color counter 316 are further described below with reference to FIG. 4.

IV. Example Raster Image

Figure 4:
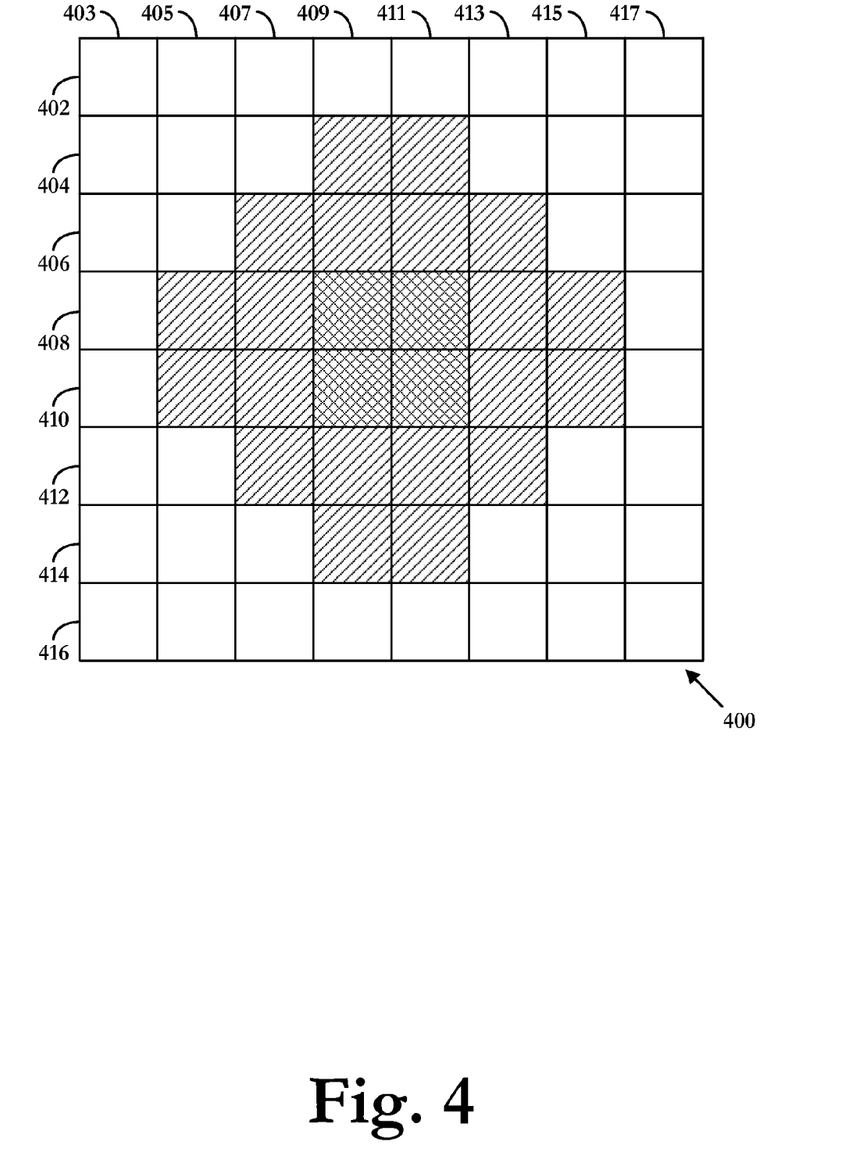
FIG. 4 illustrates a raster image in the form of a bitmap, in accordance with one or more embodiments.

FIG. 4 illustrates a raster image in the form of a bitmap 400, in accordance with one or more embodiments. A raster image in the form of a bitmap may be hereinafter referred to as a "raster bitmap."

As shown, bitmap 400 includes a raster graphics image. The bitmap includes one or more rows and columns of color points arranged as a grid; as illustrated in FIG. 4, bitmap 400 includes rows 402, 404, 406, 408, 410, 412, 414, and 416, and columns 403, 405, 407, 409, 411, 413, 415, and 417. The entire bitmap may be referred to as raster data. Raster scan lines may be defined as either the rows or the pixels depending on the implementation. If the raster scan lines are defined as rows, the sequential pixels are defined to be pixels that are directly adjacent in a certain row. If the raster scan lines are defined as columns, the sequential pixels are defined to be pixels that are directly adjacent in a certain column.

Figure 5:
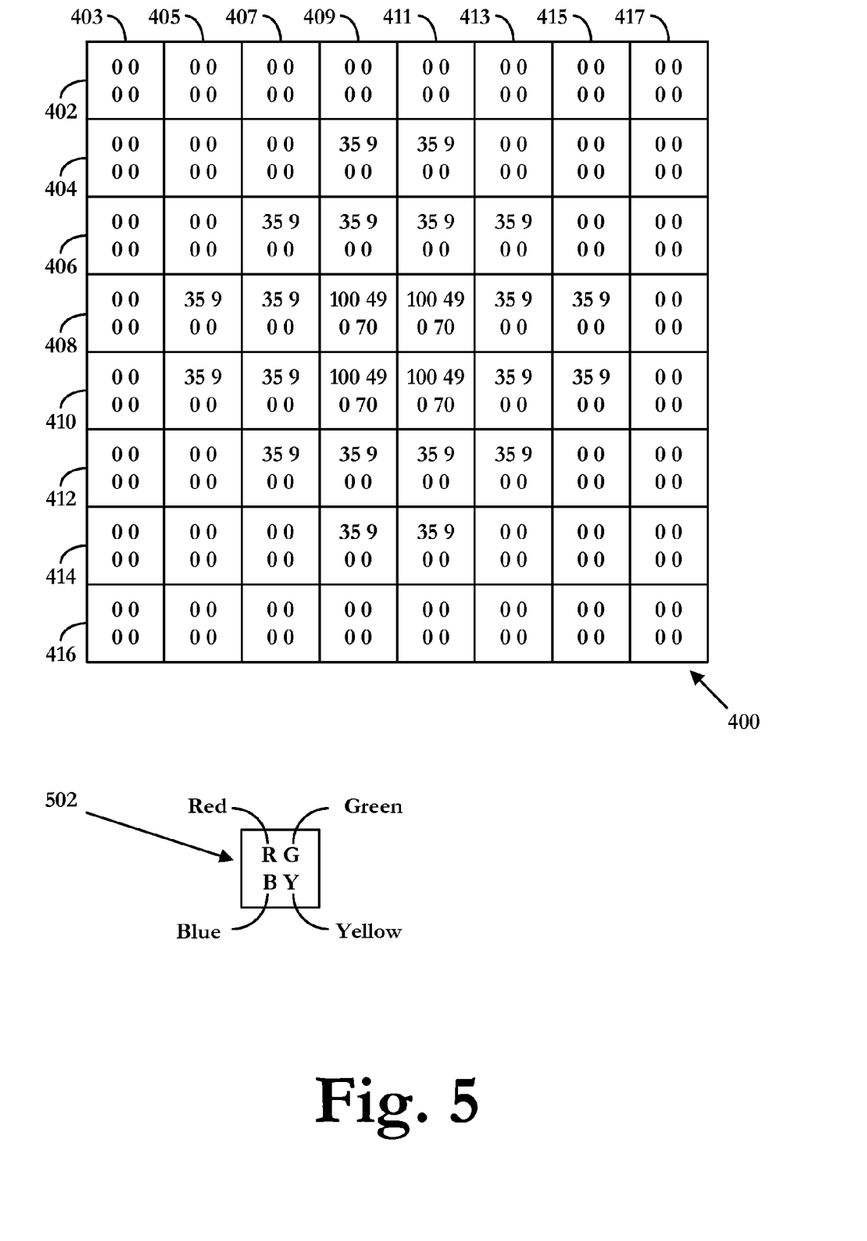
FIG. 5 illustrates a digital representation of an image, in accordance with one or more embodiments.

FIG. 5 illustrates a digital representation of a bitmap 400 of an image, in accordance with one or more embodiments. The image is represented as a bitmap of a matrix of pixel data values 502, with each pixel data value containing four values—a red value (R), a green value (G), a blue value (B), and a yellow value (Y). Note that the image may be represented in a variety of ways, using a variety of color spaces, such as HSV, XYZ, or Lab color space; an RGBY color space is used merely as an example. Toner or ink used to print color onto a page typically consists of four colors—Cyan, Magenta, Yellow, and Black (CMYK)—thus requiring a color conversion step from the original color space to the CMYK color space.

Before color conversion is performed on the image from its original color space (in this case, RGBY) to a CMYK color space, the image is processed to determine if the image contains mostly repeating pixel colors or non-repeating pixel colors. In one embodiment, each pixel is compared to its previous pixel horizontally to determine if the two adjacent pixels are the same color or different colors. If the colors of the adjacent pixels are the same, such as the two pixels in row 404 and columns 409 and 411, then they are considered sequentially repeating pixel values. If the colors of the adjacent pixels are different, such as the two pixels in row 408 and columns 407 and 409, then they are considered sequentially non-repeating pixel values. Note that other embodiments may define adjacent pixels in a different way, such as pixels that are directly above or below each other, without departing from the scope of the claims.

After each pixel has been examined and the total number of sequentially repeated pixel values and sequentially non-repeated pixel value has been determined, a color profile is selected. The color profile is used to determine how the color conversion from the original color space to the CMYK color space is performed. For instance, a text color profile may map color pixels from RGBY (or any original color space) to CMYK using all CMYK values, and may map black or gray pixels from RGBY (or any original color space) to CMYK using only K values to inhibit printing black or gray colors with cyan, magenta, or yellow toner or ink. Alternatively, a photo color profile may map all pixels from RGBY (or any original color space) to CMYK using all CMYK values. If the number of sequentially repeated pixel values is greater than the number of sequentially non-repeated pixel values, then a text color profile may be selected. Alternatively, if the number of sequentially repeated pixel values is less than or equal to the number of sequentially non-repeated pixel values, then a photo color profile may be selected. The color profiles may impose any mapping from an original color space to a CMYK color space, which may apply a more complicated set of rules that perform the color conversion without departing from the scope of the claims.

Figure 6:
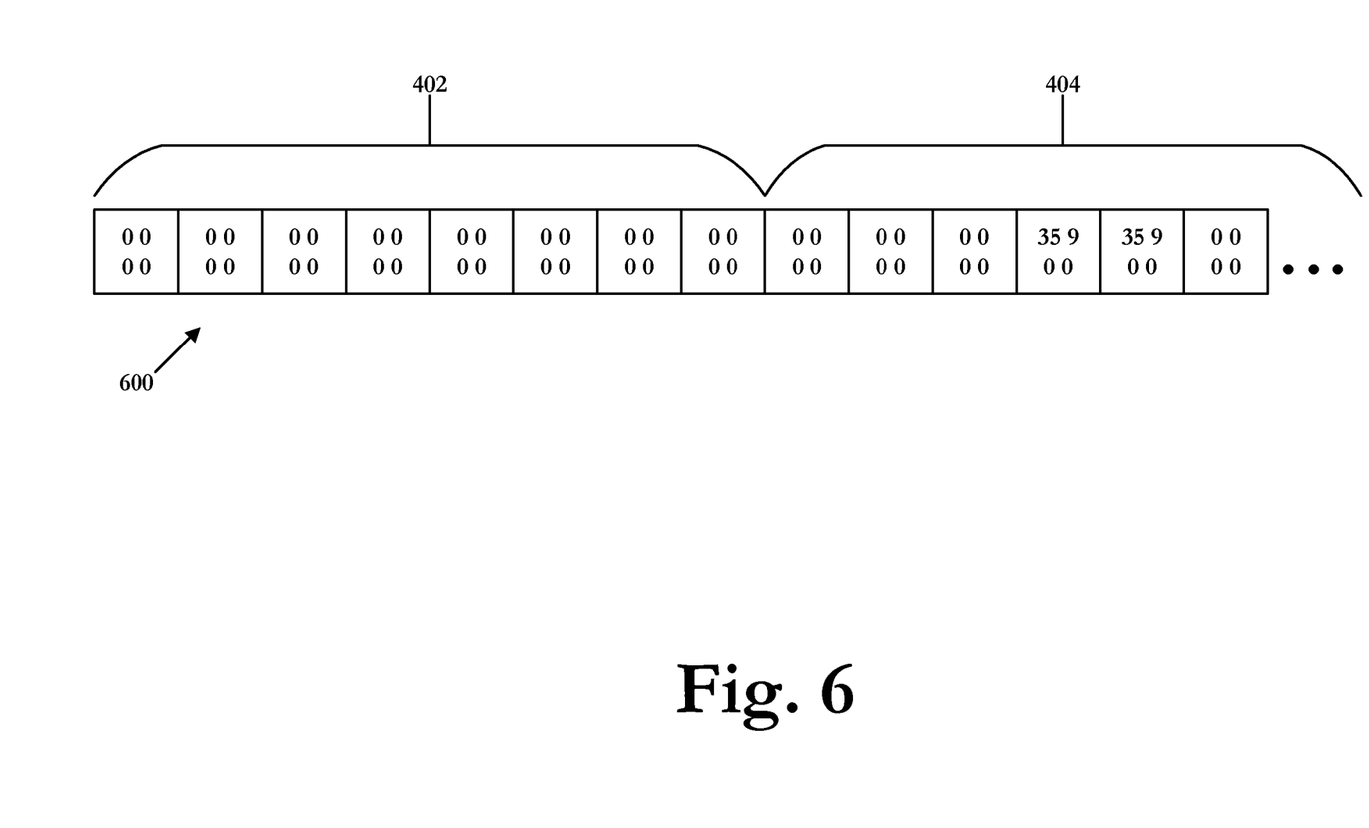
FIG. 6 illustrates a data stream containing a digital representation of an image, in accordance with one or more embodiments.

FIG. 6 illustrates a data stream 600 containing a digital representation of an image, in accordance with one or more embodiments. Specifically, it depicts the data stream 600 conveying information associated with the bitmap 400, and in particular, row 402 and a portion of row 404.

V. Example Operation

Figure 7:
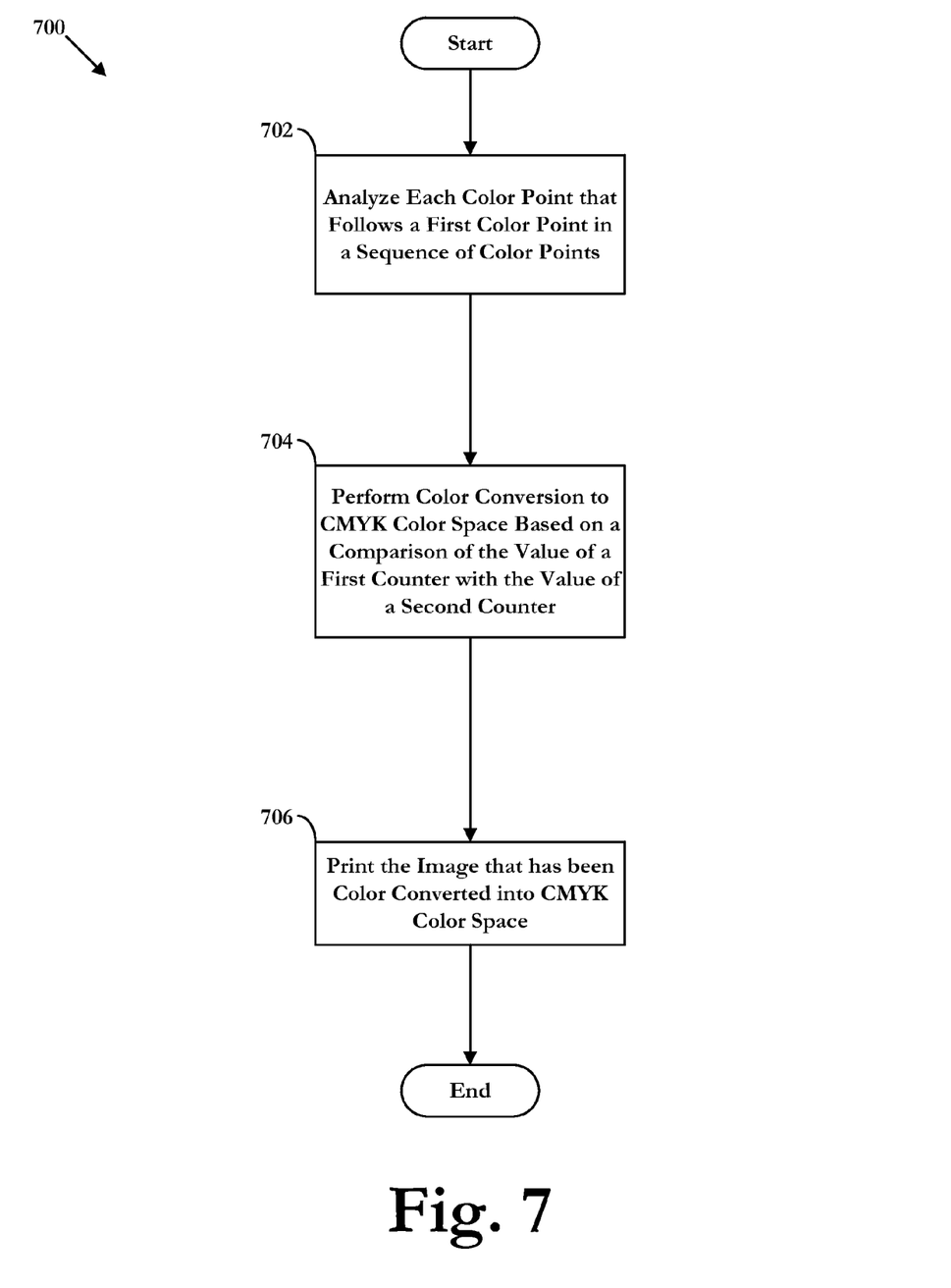
FIG. 7 illustrates a flowchart of a method, in accordance with one or more embodiments.

FIG. 7 illustrates a flowchart of a method 700, in accordance with one or more embodiments.

As shown in FIG. 7, method 700 begins at step 702 with image forming system 100 analyzing each color point in an image that follows a first color point in a sequence of color points. Step 704 then includes printing performing a color conversion on the sequence of color points of the image from its original color space into the CMYK color space based on a comparison between the values of two counters. Step 706 includes printing the image that has been color converted into the CMYK color space.

Figure 8:
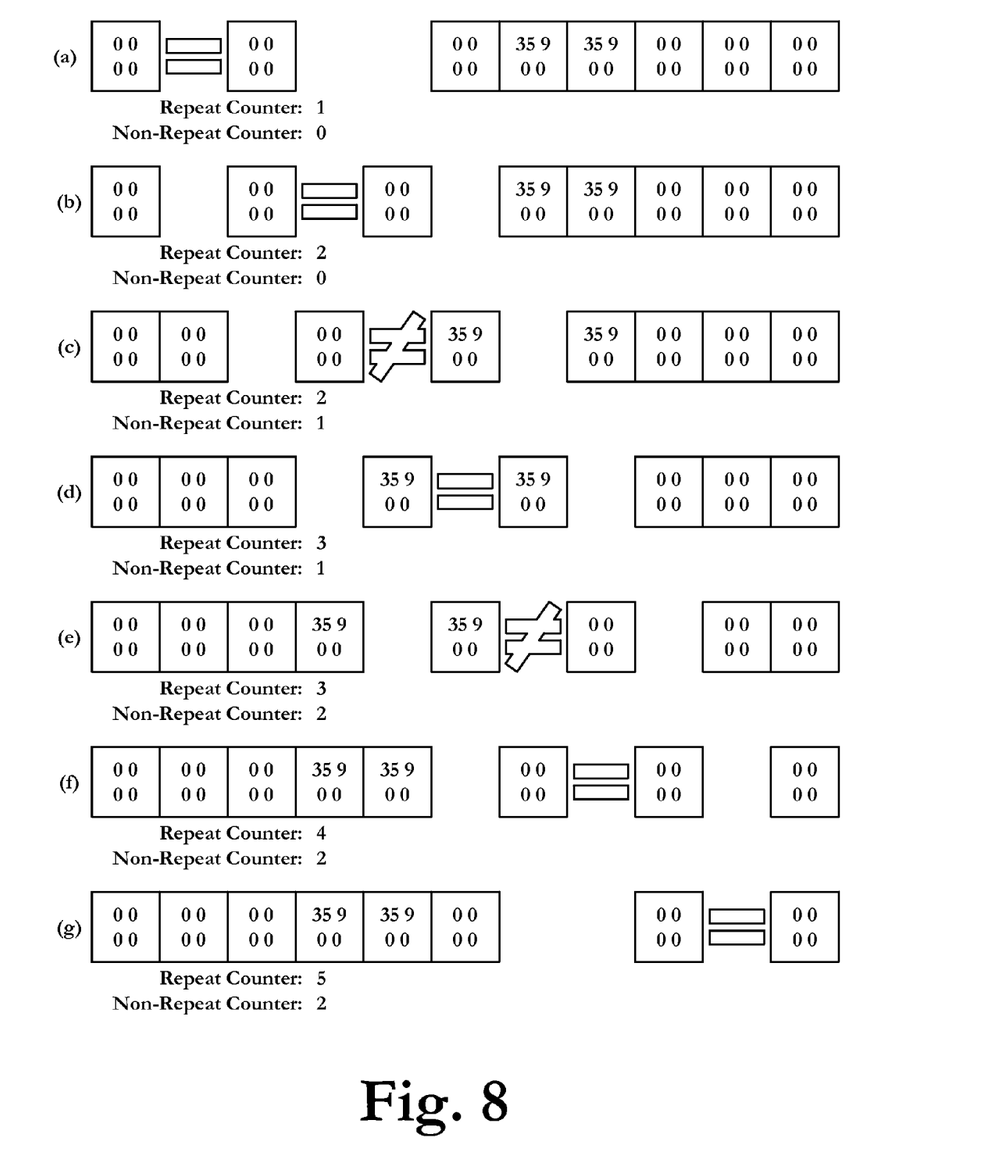
FIG. 8 illustrates an example analysis of each color point that follows a first color point in a sequence of color points.

FIG. 8 illustrates an example analysis of each color point that follows a first color point in a sequence of color points. In the example illustrated in FIG. 8, the sequence of color points analyzed is from row 404 of bitmap 400. Each of (a) through (g) in FIG. 8 illustrates an analysis of a respective color point in row 404. The "next" color point is to the right of any given color point, and the "previous" color point is to the left. Thus, the left-most color point in row 404 is the "first" color point in the sequence because that color point has no previous color point. Likewise, the right-most color point is the "last" color point because that color point has no next color point. Because row 404 includes eight color points (n=8), an analysis of each color point that follows the first color point in the row requires analysis of seven color points (n−1). Each of analyses (a) through (g) corresponds to one of these seven analyses. It should be understood that analyses (a) through (g) do not need to be performed in any particular order.

In an embodiment, analyzing a respective color point in a sequence of color points includes incrementing a first counter if a color value of the color point is equal to a color value of a previous color point in the sequence.

At analysis (a), processor 308 analyzes the color point in column 405 of row 404. Because the "previous" color point in this example is the color point to the left of any given color point, the color point previous to the color point in column 405 is the color point in column 403. Processor 308 increments the value of repeated-color counter 413 because the value of the color point in column 405 is equal to the value of the color point in column 403. In this example, the value of counter 314 is initially zero, so processor 308 increments the value of this counter from zero to one at analysis (a).

Similarly, at analysis (b), processor 308 analyzes the color point in column 407 of row 404. The color point previous to the color point in column 407 is the color point in column 405. Processor 308 again increments the value of repeated-color counter 314 because the value of the color point in column 407 is equal to the value of the color point in column 405. Thus, the value of repeated-color counter 314 is two after analysis (b).

In an embodiment, analyzing a respective color point in a sequence of color points includes incrementing a second counter if the color value of the color point is not equal to the color value of the previous color point in the sequence.

At analysis (c), processor 308 analyzes the color point in column 409 of row 404. The color point previous to the color point in column 409 is the color point in column 407. Processor 308 increments the value of non-repeated-color counter 316 because the value of the color point in column 409 is not equal to the value of the color point in column 407. In this example, the value of counter 316 is initially zero, so processor 308 increments the value of this counter from zero to one at analysis (c). After analysis (c), the value of repeated-color counter 314 is two and the value of non-repeated-color counter 316 is one.

At step 706 (after performing the analysis in step 702 and the color conversion in 704), imaging unit 302 prints the raster data that has been converted to the CMYK color space.

The comparison of the value of the first counter with the value of the second counter could be (or include) a determination that the value of the first counter is greater than (or perhaps equal to) the value of the second counter. As another possibility, the comparison could be (or include) a determination that the value of the first counter is less than (or perhaps equal to) the value of the second counter.

Figure 9:
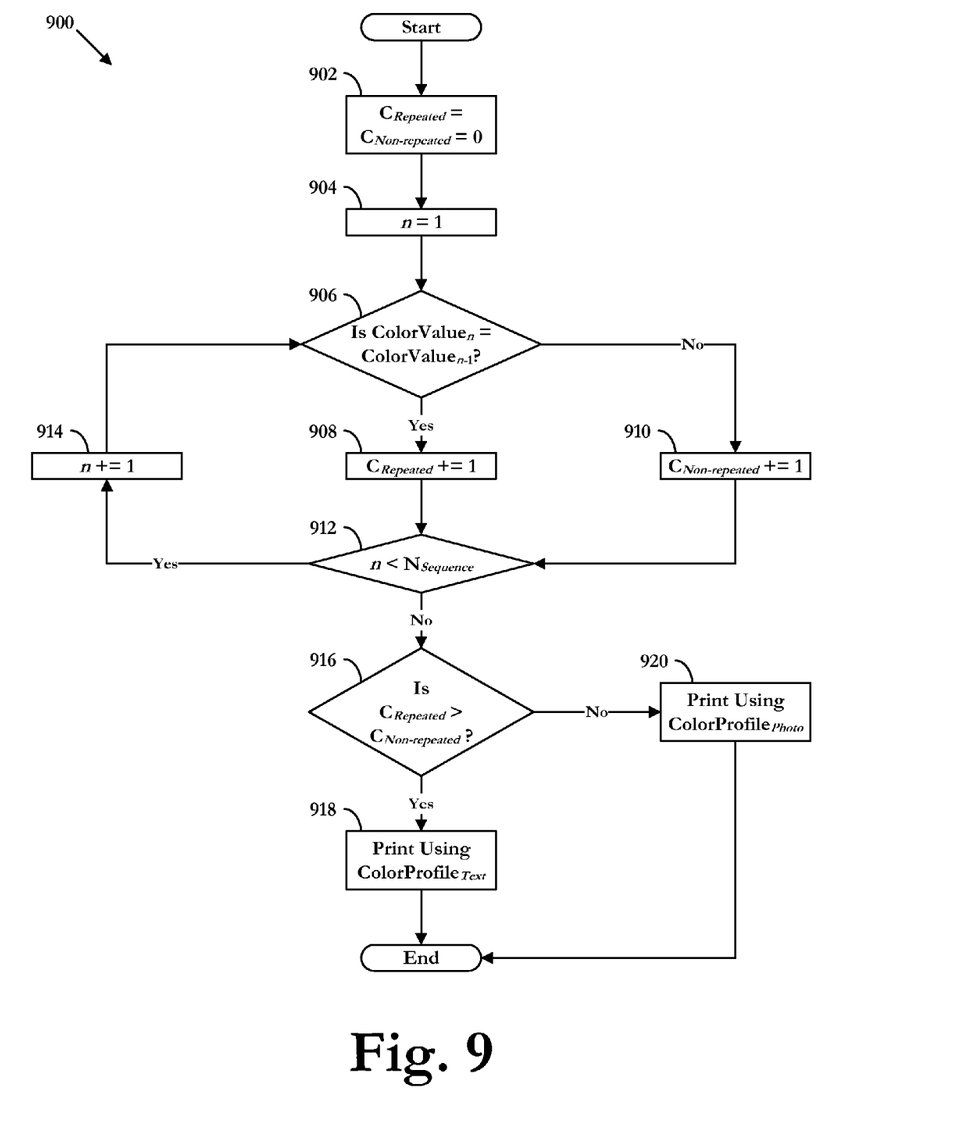
FIG. 9 illustrates a flowchart of a second method, in accordance with one or more embodiments.

FIG. 9 illustrates a flowchart of a second method 900, in accordance with one or more embodiments. As shown, method 900 begins at step 902 with processor 308 setting both a repeated-color counter and a non-repeated color counter to zero. At step 904, processor 308 sets a variable n to the value 1.

At step 906, processor 308 determines whether the color value of the nth color point in a sequence of color points is equal to the (n−1)th color point in the sequence. The first color point in the sequence is n=0, the second color point is n=1, etc., and the number of color points is represented by the value N. Accordingly, the variable n=1 when processor 308 first performs step 904 with respect to a given sequence of color points, and the imaging system thus compares the color value of the second color point in the sequence with the color value of the first color point in the sequence.

If the color value of color point n is equal to the color value of color point n−1, then processor 308 increments the value of repeated-color counter 314 at step 908. If, on the other hand, the color value of color point n is not equal to the color value of color point n−1, then processor 308 increments the value of non-repeated-color counter 316 at step 910.

After steps 908 and 910 (that is, after incrementing either repeated-color counter 314 or non-repeated-color counter 316), processor 308 then determines at step 912 whether n<N—that is, whether color point n is the last color point in the sequence. If n<N, then color point n is not the last color point in the sequence, and processor 308 increments the value of n at step 914. Otherwise, processor 308 determines at step 912 that the color point n is the last color point in the sequence.

The comparison of the number of repeated color points and non-repeated color points aids in determining which color profile image forming apparatus 102 should employ. In one embodiment, a greater number of repeated color points compared to non-repeated color points suggests that the raster data received is indicative of a document containing mostly text, because text documents typically use a single color for the characters against a single color for the background. Conversely, a greater number of non-repeated color points compared to repeated color points suggests that the raster data received is indicative of a document containing mostly images, because the pixels that make up images typically use a variety of colors to depict the image. Utilizing a repeated-color counter 314 and a non-repeated-color counter 316 is only one example metric that may be used to determine a color profile to be used by an imaging unit 302 to print raster data; other metrics may be used without departing from the scope of the claims.

After determining at step 912 that color point n is the last color point in the sequence, processor 308 at step 916 compares the value of repeated-color counter 314 to the value of non-repeated-color counter 316. If the repeated-color counter 314 is greater than the non-repeated-color counter 316, the imaging unit 302 prints the raster data using a text color profile. If the repeated-color counter 314 is less than or equal to the non-repeated-color counter 316, the imaging unit 302 prints the raster data using a photo color profile.

It should be understood that various changes and modifications to the embodiments presently described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a communication link for receiving raster data from a computing device;
a data storage unit for storing the raster data, a number of sequentially repeated digital pixel values in the raster data, and a number of sequentially non-repeated digital pixel values in the raster data;
a processor for (i) determining the number of sequentially repeated digital pixel values and the number of sequentially non-repeated digital pixel values, (ii) comparing the number of sequentially repeated digital pixel values and the number of sequentially non-repeated digital pixel values with each other, and (iii) based on the comparison, selecting a color profile, out of a plurality of color profiles, to be used to print the raster data; and
an image forming apparatus for printing the raster data using the color profile selected by the processor,
wherein,
if the comparison indicates that the number of sequentially repeated digital pixel values is greater than the number of sequentially non-repeated digital pixel values, the processor selects a first color profile out of the plurality of color profiles, and
if the comparison indicates that the number of sequentially repeated digital pixel values is less than or equal to the number of sequentially non-repeated digital pixel values, the processor selects a second color profile out of the plurality of color profiles, the second color profile being different from the first color profile.

2. The system of claim 1, wherein the first color profile is a text color profile for printing text.

3. The system of claim 1, wherein the second color profile is a photo color profile for printing a photo.

4. The system of claim 1, wherein the computing device comprises a personal computer, a smartphone, or a scanner.

5. The system of claim 1, wherein the communication link comprises a modem connection, an Ethernet connection, a Wi-Fi connection, a Universal Serial Bus (USB) connection, or a Bluetooth connection.

6. A method comprising:
receiving raster data comprising a plurality of raster scan lines, wherein each raster scan line comprises a sequence of digital pixel values;
determining a number of sequentially repeated digital pixel values and a number of sequentially non-repeated digital pixel values for the plurality of raster scan lines;
comparing the number of sequentially repeated digital pixel values and the number of sequentially non-repeated digital pixel values with each other;
based on the comparison, selecting a color profile, out of a plurality of color profiles, to be used to print the raster data; and
printing the raster data using the selected color profile,
wherein,
if the comparison indicates that the number of sequentially repeated digital pixel values is greater than the number of sequentially non-repeated digital pixel values, a first color profile is selected out of the plurality of color profiles, and
if the comparison indicates that the number of sequentially repeated digital pixel values is less than or equal to the number of sequentially non-repeated digital pixel values, a second color profile is selected out of the plurality of color profiles, the second color profile being different from the first color profile.

7. The method of claim 6, wherein determining the number of sequentially repeated digital pixel values comprises comparing adjacent digital pixel values in each raster scan line for the plurality of raster scan lines and incrementing the number of sequentially repeated digital pixel values if the adjacent pixels have equivalent digital pixel values.

8. The method of claim 6, wherein determining the number of sequentially non-repeated digital pixel values comprises comparing adjacent digital pixel values in each raster scan line for the plurality of raster scan lines and incrementing the number of sequentially non-repeated digital pixel values if the adjacent pixels have different digital pixel values.

9. The method of claim 6, wherein the first color profile is a text color profile for printing text.

10. The method of claim 6, wherein the second color profile is a photo color profile for printing a photo.

11. The method of claim 6, wherein the raster data comprises a raster bitmap representing text.

12. The method of claim 6, wherein the raster data comprises a raster bitmap representing a photo.

13. A method comprising:
receiving raster data comprising a plurality of raster scan lines;
determining a number of sequentially repeated digital pixel values and a number of sequentially non-repeated digital pixel values for the plurality of raster scan lines;
comparing the number of sequentially repeated digital pixel values and the number of sequentially non-repeated digital pixel values with each other;
determining a document type based at least on the comparison;
based on the determined document type, selecting a color profile, out of a plurality of color profiles, to be used to print the raster data ; and
printing the raster data using the selected color profile,
wherein,
if the comparison indicates that the number of sequentially repeated digital pixel values is greater than the number of sequentially non-repeated digital pixel values, a first color profile is selected out of the plurality of color profiles, and
if the comparison indicates that the number of sequentially repeated digital pixel values is less than or equal to the number of sequentially non-repeated digital pixel values, a second color profile is selected out of the plurality of color profiles, the second color profile being different from the first color profile.

14. The method of claim 13, wherein the document type is a text document type if the number of sequentially repeated digital pixel values is greater than the number of sequentially non-repeated digital pixel values.

15. The method of claim 13, wherein the document type is a photo document type if the number of sequentially repeated digital pixel values is less than or equal to the number of sequentially non-repeated digital pixel values.

16. The method of claim 14, wherein the first color profile is a text color profile for printing a text document.

17. The method of claim 15, wherein the second color profile is a photo color profile for printing a photo document.

* * * * *